United States Patent [19]

Fielding-Russel et al.

[11] 4,059,254
[45] Nov. 22, 1977

[54] ENERGY ABSORBING UNIT

[75] Inventors: George Samuel Fielding-Russel; Alan N. Gent, both of Stow, Ohio

[73] Assignee: The Goodyear Tire & Rubber Company, Akron, Ohio

[21] Appl. No.: 736,618

[22] Filed: Oct. 28, 1976

[51] Int. Cl.$^2$ .................... B60R 19/08; F16F 7/12
[52] U.S. Cl. .................... 267/140; 293/88; 293/89
[58] Field of Search .............. 267/63 R, 136, 153, 267/138-141; 104/254; 114/219; 213/9, 59, 220, 221; 248/20, 22, 24; 293/1, 66, 70, 71 R, 73, 85, 86, 88, 89, 99

[56] References Cited

U.S. PATENT DOCUMENTS

| 1,702,675 | 2/1929 | Ventura | 293/70 UX |
| 3,146,013 | 8/1964 | Kappen | 293/85 X |
| 3,432,200 | 3/1969 | Barton | 293/88 X |
| 3,819,167 | 6/1974 | Nakamura et al. | 267/139 |
| 3,854,765 | 12/1974 | Church et al. | 293/88 |
| 3,857,596 | 12/1974 | Nakamura et al. | 267/140 X |

Primary Examiner—Johnny D. Cherry
Attorney, Agent, or Firm—F. W. Brunner; L. A. Germain

[57] ABSTRACT

An energy absorber comprises an elastomeric member in a substantially trapezoidal configuration, a piston connected to the apex of the trapezoid, and piston retaining and mounting supports. The elastomer absorbs energy by virtue of its inclined buckling columns forming the sides of the trapezoid while the piston is forced to move in a substantially horizontal plane by the piston retaining and mounting supports. The energy absorber, when applied to vehicle applications, provides a bumper mount that accepts frontal and lateral force impact and lends itself to bumper jacking and towing forces.

6 Claims, 3 Drawing Figures

ENERGY ABSORBING UNIT

BACKGROUND OF THE INVENTION

This invention relates to an energy absorber and more particularly to a configuration for an energy absorbing device for vehicle use that accepts frontal and lateral impacts while meeting both vehicle jacking and towing requirements.

In recent years, vehicle safety has become a major concern of both the public and the manufacturer. Furthermore, legislation calling for automotive bumpers to protect motor vehicles from sustaining significant damage in an 8-km/h (5-mph) impact has increased public awareness of vehicle safety while imposing restraints on the manufacturer who must meet the legislative requirement while attempting to hold down overall manufacturing costs.

Thus, many types of energy absorbing systems have been devised to meet the legislative requirement. These systems have become sophisticated and complex to the point of adding substantial cost and weight to the vehicle at a time when weight reduction is important for decreased fuel consumption. Furthermore, these prior art devices make it extremely difficult to optimize energy absorption and spatial requirements in a single system that is adaptable to many different vehicle sizes and frame configurations.

It is therefore an object of this invention to provide an energy absorber that is assembled from a minimum of parts, is adaptable to many types of mounting configurations, meets the present legislative requirement for frontal and lateral impact safety, absorbs more energy at lower impact forces, accepts vertical loads such as experienced in vehicle jacking situations, and accepts horizontal towing loads that are in a direction opposite to the frontal impact loads against which the device is originally designed to provide protection.

SUMMARY OF THE INVENTION

According to this invention, the beforementioned and related objects are accomplished in an energy absorber comprising: an elastomeric member having forward and rearward ends and characterized by inclined columns terminating in a base member at its rearward end and in an apex member at its forward end; a piston attached to the apex member and slidably received through the base member and extending rearwardly of the base member; mounting means abutting the base member for receiving the rearwardly extending portion of the piston such that the piston is restricted to motion in a substantially horizontal plane; and pin means fastened to the piston in a manner to limit its forward and rearward horizontal excursion by reason of the pin's interaction with the stationary means while also providing a pivot for the piston during any angular excursion in the horizontal plane.

DESCRIPTION OF THE DRAWINGS

The features of the invention may best be understood from a consideration of the following description taken in conjunction with the accompanying drawing, in the several figures of which like reference numerals identify like elements, and in which.

DESCRIPTION OF THE INVENTION

Figure 1:
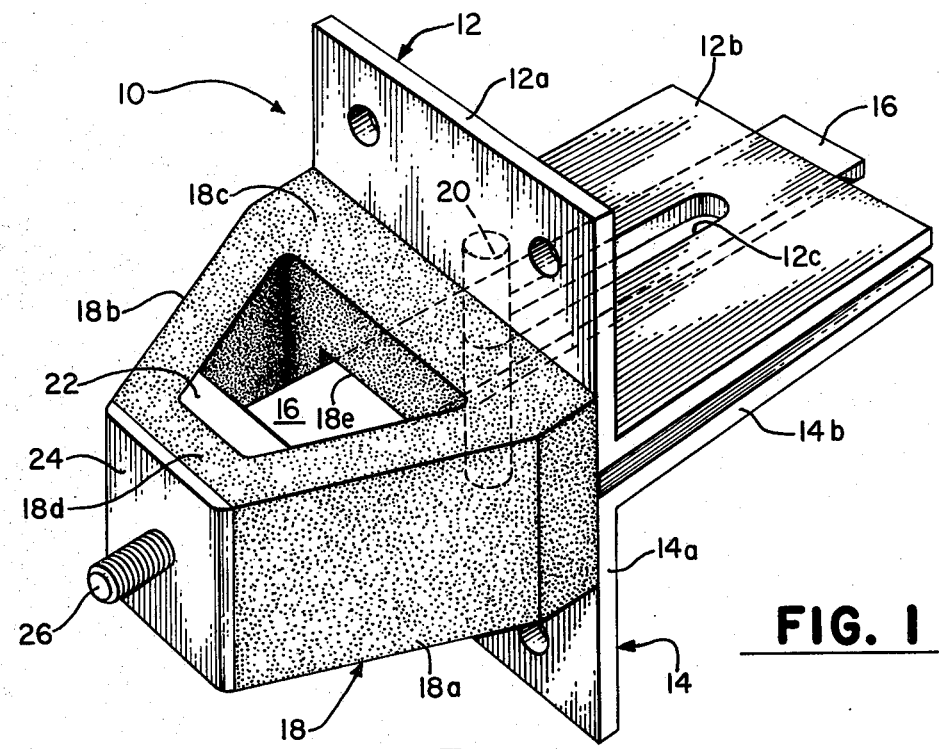
FIG. 1 is a perspective view illustrating the energy absorbing unit comprising the invention.

In the drawing, an energy absorbing unit according to this invention is generally indicated by reference numeral 10. The unit 10 generally comprises a pair of plates 12, 14 carrying a piston member 16 affixed to an elastomeric member 18.

More specifically, the plates 12, 14 are identical 90° angles of high strength steel adapted for attachment in a mirror relationship to the framing members forming a vehicle chassis. The upper angle 12 has a vertical leg 12a and the lower angle 14 has a vertical leg 14a that may be bolted or welded to the vehicle frame. The angles 12, 14 also have horizontal legs 12b, 14b respectively that carry the piston member 16 in sliding relationship therebetween. Each of the horizontal members 12b, 14b of the plates 12, 14 have slots 12c, 14c respectively for carrying a steel pin 20 in sliding relationship therein. The pin 20 is vertically oriented through the piston 16 such that a top vertical portion 20a is received in the slot 12c of the upper horizontal plate member 12b while a bottom vertical portion 20b is received in the slot 14c of the lower horizontal plate member 14b.

As herebefore mentioned, the piston 16 has one end slidably received between the horizontal members 12b, 14b of the plates 12, 14. The other end of the piston 16 is attached to the elastomeric member 18 by a pair of backing plates 22, 24. The elastomeric member 18 comprises a substantially trapezoidal section having inclined columns 18a, 18b connected at one end by a cross member 18c forming the base and at the other end by a cross member 18d forming the apex. The base 18c is mounted adjacent to the vertical members 12a, 14a of the mounting plates 12, 14 and carries a slot 18e for receiving the piston member therethrough. The apex carries a bore 18f for receiving a bolt 26 that is welded or otherwise attached to backing plate 22. The bolt is for attachment of the vehicle bumper or fender to the energy absorber 10 as illustrated in FIG. 2, the bumper 30 being illustrated in ghost lines.

Figure 2:
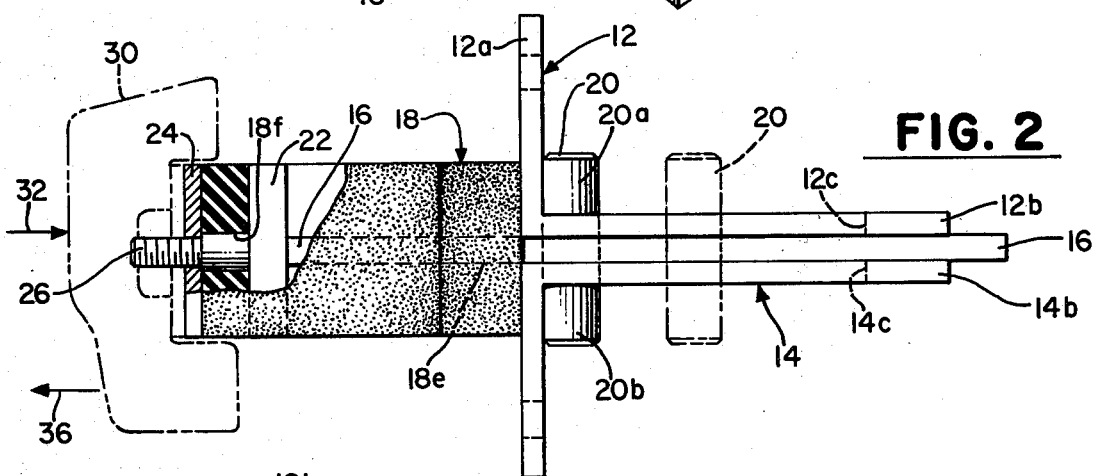
FIG. 2 is a side elevational view of the energy absorbing unit illustrated in FIG. 1.
Figure 3:
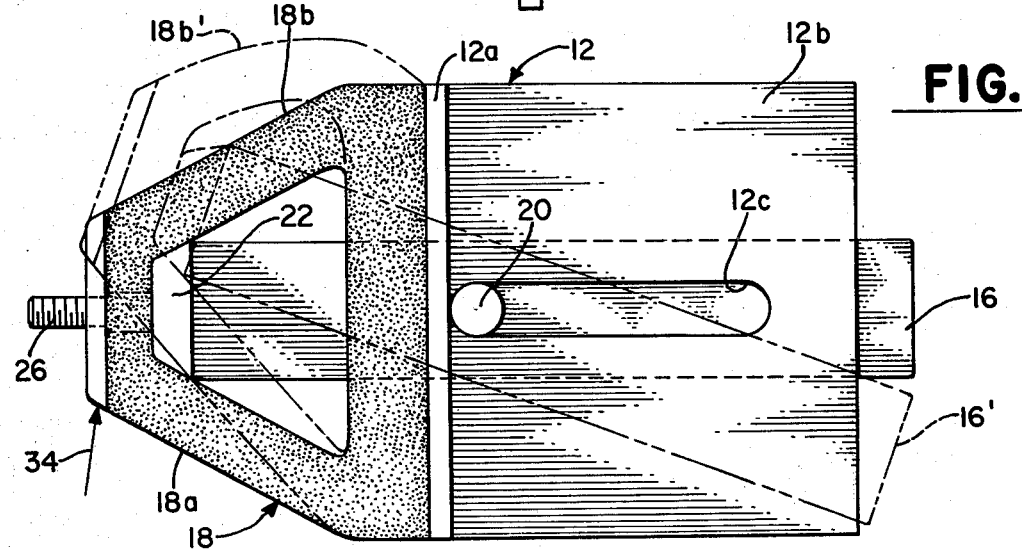
FIG. 3 is a plan view of the energy absorber illustrated in FIG. 1 showing the displacement of the movable member due to frontal and lateral impacts.

Referring to FIGS. 2 and 3, it can be appreciated that the energy absorber 10 achieves a horizontal energy absorbing motion in the direction of a frontal impact force indicated by reference numeral 32. In this circumstance, the pin 20 moves with the piston 16 along the slots 12c, 14c. Upon removal of the impact force 32, the elastomeric member 18 returns to its original shape while the piston and pin also move back to their original position. Now therefore, upon receiving a lateral impact as indicated by force arrow 34, the elastomeric member bends away from its normal axis as shown by the ghost figure 18b', while the piston rotates about the pin 20. Upon removal of the lateral impact force 34 the elastomeric member 18 again returns to its normal shape and position while the piston rotates about the pin 20 back to its normal position. As illustrated in FIG. 2, the pin 20 is normally in an abutting relationship with the vertical plate members 12a 14a and is thus in a position to accept horizontal towing forces in the direction of arrow 36. By the same token, positioning of the piston member between the horizontal plates 12b, 14b adds vertical strength to the energy absorber 10 such that it may accept vertical jacking loads applied directly to the bumper 30.

In view of the foregoing description, it should now be appreciated that the invention provides an energy absorber for vehicular application that lends itself to mass production by virtue of its simple design. For example, the elastomeric member 18 may be extruded in long lengths and cut to the desired thickness while the plates 12, 14 are identical and interchangeable parts. Further, the energy absorber comprises a minimum of manufactured parts which results in a lighter weight assembly that is self-restoring after impact, permits bumper jacking and towing, sustains both frontal and lateral impact forces, and absorbs more energy at lower impact forces to prevent damage to the vehicle structure.

While certain representative embodiments and details have been shown for the purpose of illustrating the invention, it will be apparent to those skilled in this art that various changes and modifications may be made therein without departing from the spirit or scope of the invention.

What is claimed is:

1. An energy absorber comprising:
   A. an elastomeric member having forward and rearward ends interconnected by inclined columns terminating in a base member at its rearward end and in an apex member at its forward end;
   B. a piston attached to the apex member and slidably received through the base member, extending rearwardly of the base member;
   C. mounting means positioned to abut the base of the elastomer member for receiving the rearwardly extending portion of the piston such that the piston is restricted to motion in a substantially horizontal plane; and
   D. pin means fastened to the piston in a manner to limit its forward horizontal excursion by reason of the pin's interaction with the mounting means while also providing a pivot for the piston during an angular excursion in the horizontal plane.

2. The energy absorber as set forth in claim 1 wherein the mounting means comprises a pair of plates having vertical and horizontal members forming 90° angles, the horizontal members having lengthwise slots therein and positioned relative to one another such that the slots are in registration, said plates being positioned such that one is an upper plate having an upward oriented vertical member while the other is a lower plate having a downward oriented vertical member, said pin means retained in the slots of the horizontal plate members and limited in its forward horizontal excursion by the vertical plate members.

3. The energy absorber as set forth in claim 1 wherein the piston comprises a steel rod.

4. The energy absorber as set forth in claim 1 wherein the piston comprises an elongated steel bar.

5. An energy absorber comprising:
   A. a pair of plates having vertical and horizontal members forming 90° angles, the horizontal plate members having lengthwise slots therein and positioned relative to one another such that the slots are in registration, said plates being positioned such that one is an upper plate having an upward oriented vertical member while the other is a lower plate having a downward oriented vertical member;
   B. a piston positioned between the horizontal plate members and having a vertically oriented pin mounted therethrough such that an upper portion of the pin is retained in the slot of the upper horizontal plate member while a lower portion of the pin is retained in the slot of the lower horizontal plate member, said piston pivotable about the pin and capable of horizontal movement as defined by the pin-slot relationship, said piston having one of its ends confined between the horizontal plate members while the opposite end extends beyond the confines of the vertical plate members; and
   C. an elastomeric member having inclined columns terminating at one end in a base member and at the other end in an apex member, said base member receiving the end of the piston therethrough that is ultimately attached to the apex of the elastomeric member such that the apex and piston move as an integral unit upon buckling of the columns due to a frontal or lateral impact force.

6. The energy absorber as set forth in claim 5 wherein the piston comprises a steel bar attached to the apex of the elastomeric member by
   a. a first backing plate having one of its sides fastened to the bar and its opposite side fastened to a bolt stud, said backing plate positioned on the inside of the elastomeric member between the apex and the base such that the bolt stud penetrates through the apex member, and
   b. a second backing plate mounted on the bolt stud on the opposite side of the apex member.

* * * * *